United States Patent Office 3,488,359
Patented Jan. 6, 1970

3,488,359
1,4-DIHYDROPYRIDINE DERIVATIVES
Friedrich Bossert, Wuppertal-Elberfeld, and Wulf Vater, Opladen, Germany, assignors to Farbenfabriken Bayer Aktiengesellschaft, Leverkusen, Germany, a corporation of Germany
No Drawing. Filed Mar. 14, 1968, Ser. No. 712,909
Claims priority, application Germany, Mar. 20, 1967, F 51,878
Int. Cl. C07d 31/34, 31/36; A61k 27/00
U.S. Cl. 260—295.5                                    28 Claims

ABSTRACT OF THE DISCLOSURE 1,4-dihydropyridine derivatives of the formula:

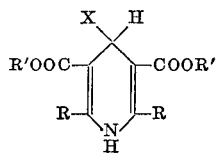

wherein R is hydrogen or alkyl of 1 to 3 carbon atoms, R' is alkyl or alkylene of 1 to 6 carbon atoms interrupted by one or more oxygen atoms or substituted by hydroxyl, and X is pyridyl, phenyl, pyridyl substituted by halogen, 1 or 2 lower alkyl, lower alkoxy, nitro, amino, acylamino or alkylamino or phenyl substituted by halogen, 1 or 2 lower alkyl, lower alkoxy, nitro, amino, acylamino or alkylamino, and pharmaceutically acceptable non-toxic salts thereof are produced by reacting pyridine-aldehydes or substituted benzaldehydes with acyl-fatty acid esters of the formula

R—CO—CH$_2$—COOR' wherein R and R' are as above defined, with ammonia. These compounds are useful in the treatment of coronary insufficiency and particularly in disturbances of the blood supply to the coronary vessels. The compounds have been found to be particularly effective in the treatment of angina pectoris.

---

The present invention is concerned with 1,4-dihydropyridine derivatives of the formula:

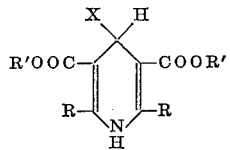

wherein:

R is hydrogen or alkyl of 1 to 3 carbon atoms,
R' is alkyl or alkylene of 1 to 6 carbon atoms interrupted by one or more oxygen atoms or substituted by hydroxyl, and
X is pyridyl, phenyl, pyridyl substituted by halogen, 1 or 2 lower alkyl, lower alkoxy, nitro, amino, acylamino or alkylamino or phenyl substituted by halogen, 1 or 2 lower alkyl, lower alkoxy, nitro, amino, acylamino or alkylamino and pharmaceutically acceptable non-toxic salts thereof.

Because of the increased importance of therapeutic substances useful in the treatment of coronary insufficiency, this field has become a fertile area for research. Moreover, besides the disturbances of the blood supply to the coronary vessels, such conditions and the like conditions often produce serious diseases also requiring treatment and the commercially available preparations have not always given reliable results. This is particularly true for the treatment of coronary insufficiency such as the very painful angina pectoris. Thus, in general the most common method of treatment comprises the use of nitrites which produce a heart relieving effect.

The 1,4-dihydropyridine derivatives of the present invention have upon intravenous or oral administration produced a marked and long-lasting dilation of the coronary vessels with a duration superior to that of any known commercial product. In the animal experiments involved the effect on the coronary vessels is advantageously supported by a nitrite-like effect which is simultaneously present.

The 1,4-dihydropyridine derivatives of the present invention are produced by reacting pyridine-aldehydes or substituted benzaldehydes with acyl-fatty acid esters of the formula R—CO—CH$_2$—COOR', in which R is hydrogen or alkyl of 1 to 3 carbon atoms and R' is alkyl or alkylene with 1 to 6 carbon atoms which is interrupted by one or more oxygen atoms or which is substituted by hydroxyl, with ammonia in a suitable organic solvent such as methanol or alcohol. These compounds are soluble and stable in water either in the free form or in the form of their salts with non-toxic inorganic or organic acids.

Previous attempts to use the simple esters, i.e. where R is alkyl of 1–4 carbon atoms, as coronary agents has been unsuccessful because these compounds proved to be unstable when dissolved in water in the form of their salts.

The compounds of the present invention are therefore superior to any known commercially available compounds.

| Compound of— | Coronary activity on dogs, mg./kg. i.v. |
|---|---|
| Example 1: | |
| 4-(4'-pyridyl)-2,6-dimethyl-3,5-di-(carboxylic acid-β-methoxy-ethylester)-1,4-dihydropyridine | 3.0 |
| 4-(2'-pyridyl)-2,6-dimethyl-3,5-di-(carboxylic acid-β-methoxy-ethylester-1,4-dihydropyridine | 0.5 |
| Example 2: | |
| 4-(2'-pyridyl)-2,6-dimethyl-3,5-di-(carboxylic acid-β-ethoxy-ethylester)-1,4-dihydropyridine | 0.5 |
| 4-(4'-pyridyl)-2,6-dimethyl-3,5-di-(carboxylic acid-β-ethoxy-ethylester)-1,4-dihydropyridine | 0.5 |
| Example 3: | |
| 4-(3'-pyridyl)-2,6-dimethyl-3,5-di-(carboxylic acid-β-propoxy-ethylester)-1,4-dihydropyridine | 0.1 |
| 4-(2'-pyridyl)-2,6-dimethyl-3,5-di-(carboxylic acid-β-propoxy-ethylester(-1,4-dihydropyridine | 0.05 |
| Example 4: | |
| 4-(2'-pyridyl)-2,6-dimethyl-3,5-di-(carboxylic acid-γ-methoxy-butylester)-1,4-dihydropyridine | 0.500 |
| Example 5: | |
| 4-(2'-pyridyl)-2,6-dimethyl-3,5-di-(carboxylic acid-β-hydroxy-ethylester)-1,4-dihydropyridine | 5.000 |
| 4-(3'-pyridyl)-2,6-dimethyl-3,5-di-(carboxylic acid-β-hydroxy-ethylester)-1,4-dihydropyridine | 10.000 |
| Example 6: | |
| 4-(2'-nitrophenyl)-2,6-dimethyl-3,5-di-(carboxylic acid-β-hydroxy-ethylester)-1,4-dihydropyridine | 0.200 |
| Example 7: | |
| 4-(2'-nitrophenyl)-2,6-dimethyl-3,5-di-(carboxylic acid-β-methoxy-ethylester)-1,4-dihydropyridine | 0.030 |
| Example 8: | |
| 4-(2'-nitrophenyl)-2,6-dimethyl-3,5-di-(carboxylic acid-β-ethoxy-ethylester)-1,4-dihydropyridine | 0.050 |
| 4-(3'-nitrophenyl)-2,6-dimethyl-3,5-di-(carboxylic acid-β-ethoxy-ethylester)-1,4-dihydropyridine | 0.010 |
| Example 9: | |
| 4-(3'-nitrophenyl)-2,6-dimethyl-3,5-di-(carboxylic acid-β-propoxy-ethylester)-1,4-dihydropyridine | 0.005 |
| Example 10: | |
| 4-(2'-pyridyl)-2,6-dimethyl-3,5-di-(carboxylic acid-tetrahydrofurfurylester)-1,4-dihydropyridine | 2.000 |
| Example 11: | |
| 4-(2'-pyridyl)-2,6-dimethyl-3,5-di-(carboxylic acid-furfurylester)-1,4-dihydropyridine | 5.000 |
| 4-(4'-pyridyl)-2,6-dimethyl-3,5-di-(carboxylic acid-furfurylester)-1,4-dihydropyridine | 1.000 |

The coronary-active compounds can be appled intravenously, orally, intramuscularly, but also in the form of suppositories. The ampoules, capsules, sugar-coated pills, tablets, suppositories and the like, which are contemplated for application, generally contain approximately the following quantities; these quantities are listed below for ampoules and capsules by way of example for some compounds:

| Compound of— | Ampoules, mg. | Capsules, mg. |
|---|---|---|
| Example 1: | | |
| 4-(4'-pyridyl)-2,6-dimethyl-3,5-di-(carboxylic acid-β-methoxy-ethylester)-1,4-dihydro-pyridine | 10.0–20.0 | 50.0 |
| 4-(2'pyridyl)-2,6-dimethyl-3,5-di-(carboxylic acid-β-methoxy-ethylester)-1,4-dihydro-pyridine | 2.5–10.0 | 25.0 |
| Example 2: | | |
| 4-(2'-pyridyl)-2,6-dimethyl-3,5-di-(carboxylic acid-β-ethoxy-ethylester)-1,4-dihydro-pyridine | 2.5–10.0 | 25.0 |
| 4-(4'-pyridyl)-2,6-dimethyl-3,5-di-(carboxylic acid-β-ethoxy-ethylester)-1,4-dihydro-pyridine | 2.5–10.0 | 25.0 |
| Example 3: | | |
| 4-(3'-pyridyl)-2,6-dimethyl-3,5-di-(carboxylic acid-β-propoxy-ethylester)-1,4-dihydro-pyridine | 1.0 | 5.0 |
| 4-(2'-pyridyl)-2,6-dimethyl-3,5-di-(carboxylic acid-β-propoxy-ethylester)-1,4-dihydro-pyridine | 1.0 | 5.0 |
| Example 4: | | |
| 4-(2'-pyridyl)-2,6-dimethyl-3,5-di-(carboxylic acid-γ-methoxy-butylester)-1,4-dihydro-pyridine | 2.5–10.0 | 25.0 |
| Example 6: | | |
| 4-(2'-nitrophenyl)-2,6-dimethyl-3,5-di-(carboxylic acid-β-hydroxy-ethylester)-1,4-dihydropyridine | 2.5–10.0 | 25.0 |
| Example 7: | | |
| 4-(2'-nitrophenyl)-2,6-dimethyl-3,5-di-carboxylic acid-β-methoxy-ethylester)-1,4-dihydropyridine | 0.2 | 2.5–5.0 |
| Example 8: | | |
| 4-(2'-nitrophenyl)-2,6-dimethyl-3,5-di-(carboxylic acid-β-ethoxy-ethylester)-1,4-dihydropyridine | 1.0 | 5.0 |
| 4-(3'-nitrophenyl)-2,6-dimethyl-3,5-di-(carboxylic acid-β-ethoxy-ethylester)-1,4-dihydropyridine | 0.2 | 2.5 |
| Example 9: | | |
| 4-(3'-nitrophenyl)-2,6-dimethyl-3,5-di-(carboxylic acid-β-propoxy-ethylester)-1,4-dihydropyridine | 0.2 | 2.5 |
| Example 10: | | |
| 4-(2'-pyridyl)-2,6-dimethyl-3,5-di-(carboxylic acid-tetrahydro-furfurylester)-1,4-dihydropyridine | 10.0–20.0 | 50.0 |
| Example 11: | | |
| 4-(2'-pyridyl)-2,6-dimethyl-3,5-di-(carboxylic acid-furfurylester)-1,4-dihydropyridine | 25.0 | |
| 4-(4'-pyridyl)-2,6-dimethyl-3,5-di-(carboxylic acid-furfurylester)-1,4-dihydropyridine | 5.0–15.0 | 25.0 |

For the application in human medicine in the treatment of angina pectoris 1 to 2 ampoules are to be used per day; when the compound is administered in capsules, sugar-coated pills or tablets, 3 doses should be applied per day. The aforesaid quantities refer to persons having a body weight of about 70 kg. The application of suppositories can be varied correspondingly. Nevertheless, it may be required to apply larger or lesser quantities in dependence on the body weight, the mode of application, but also on the reaction of the individual patient to the medicament and the kind of formulation thereof as well as the date and interval of administration. Thus, it may be quite sufficient in some cases to administer less than the above-said minimum dosage, whereas the upper limit has to be exceeded in other cases. If larger doses are administered, it may be expedient to distribute same in several single doses during a day.

The coronary-active compounds being obvious from the disclosure and the examples, respectively, can be applied both for the treatment of an angina pectoris attack and for the prophylactic treatment of angina pectoris.

The following non-limitative examples illustrate the present invention.

EXAMPLE 1

4-(4'-pyridyl)-2,6-dimethyl-3,5-di-(carboxylic acid-β-methoxyethylester)-1,4-dihydropyridine 10.5 cc. pyridine-4-aldehyde, 31 cc. acetoacetic acid-β-methoxyethyl ester (B.P. 90° C./3 mm. Hg), 30 cc. alcohol and 11 cc. ammonia are heated at boiling temperature for several hours, the product is filtered off, somewhat concentrated, and after cooling there are obtained yellow crystals (22 g.) of M.P. 130° C.

In an analogous manner the following compounds were produced from the reactants indicated: 4-(3'-pyridyl)-2,6-dimethyl-3,5-di-(carboxylic acid - β - methoxyethyl-ester)-1,4 - dihydropyridine, M.P. 149 to 150° C. from pyridine-3-aldehyde, acetoacetic acid-β-methoxyethyl ester and ammonia, and 4 - (2' - pyridyl) - 2,6 - dimethyl - 3,5 - di-(carboxylic acid - β - methoxyethyl-ester) - 1,4 - dihydropyridine, M.P. 133° C. from pyridine-2-aldehyde, acetoacetic acid - β - methoxyethyl ester and ammonia.

EXAMPLE 2

4-(3'-pyridyl)-2,6-dimethyl-3,5-di-(carboxylic acid-β-ethoxyethyl-ester)-1,4-dihydropyridine After heating 10.5 cc. pyridine-3-aldehyde, 35 g. acetoacetic acid - β - ethoxyethyl ester (B.P. 98° C./9 mm. Hg), 11 cc. ammonia and 30 cc. alcohol for 6 hours, the product is filtered off, mixed with a little ether and cooled. Yellow crystals (36 g.) of M.P. 136 to 138° C. are obtained.

In an analogous manner the following compounds were produced from the reactants indicated: 4-(2'-pyridyl)-2, 6 - dimethyl - 3,5 - di - (carboxylic acid - β - ethoxyethyl ester) - 1,4 - dihydropyridine, M.P. 132 to 134° C., from pyridine-2 - aldehyde, acetoacetic acid - β - ethoxyethyl ester and ammonia, and 4-(4'-pyridyl)-2,6-dimethyl-3,5-di-(carboxylic acid - β - ethoxyethyl ester) - 1,4 - dihydropyridine, M.P. 158 to 160° C. (HCl-salt), from pyridine-4-aldehyde, acetoacetic acid-β-ethoxyethyl ester and ammonia.

EXAMPLE 3

4 - (3' - pyridyl) - 2,6 - dimethyl - 3,5 - di - (carboxylic acid-β-propoxyethyl ester)-1,4-dihydropyridine 10.5 cc. pyridine-3-aldehyde, 38 g. acetoacetic acid-β-propoxyethyl ester (B.P. 96° C./4 mm. Hg), 50 cc. alcohol and 11 cc. ammonia are heated under reflux for several hours. The product is subsequently filtered off, mixed with some ether and cooled. 30 g. of pale yellow crystals of M.P. 131 to 136° C. are obtained.

In an analogous manner the following compounds were produced from the reactants indicated: 4-(2'-pyridyl-2,6-dimethyl-3,5-di-(carboxylic acid-β-propoxyethyl ester)-1,4-dihydropyridine, M.P. 102° C., from pyridine-2-aldehyde, acetoacetic acid-β-propoxyethyl ester and ammonia, and 4-(4'-pyridyl)-2,6-dimethyl-3,5 - di - (carboxylic acid-β-propoxyethyl ester)-1,4-dihydropyridine, M.P. 97 to 100° C., from pyridine-4-aldehyde, acetoacetic acid-β-propoxyethyl ester and ammonia.

EXAMPLE 4

4 - (2' - pyridyl - 2,6 - dimethyl - 3,5 - di - (carboxylic acid - γ - methoxybutyl ester)-1,4-dihydropyridine 10.5 cc. pyridine-2-aldehyde, 38 cc. acetoacetic acid-γ-methoxybutyl ester (B.P. 100° C./4 mm. Hg), 11 cc. ammonia and 25 cc. alcohol are heated at boiling temperature for several hours. After subsequent filtering off, the mixture is concentrated, cooled, the product filtered off with suction and recrystallized from benzene-ligroin. 30 g. of crystals of M.P. 94 to 97° C. are obtained.

In an analogous manner the following compound was produced from the reactants indicated: 4-(3'-pyridyl)-2,6 - dimethyl - 3,5 - di-(carboxylic acid-γ-methoxybutyl-ester)-1,4-dihydropyridine, M.P. 118 to 120° C., from pyridine-3-aldehyde, acetoacetic acid-γ-methoxybutyl ester and ammonia.

EXAMPLE 5

4 - (2' - pyridyl - 2,6 - dimethyl - 3,5 - di - (carboxylic acid-β-hydroxyethyl ester)-1,4-dihydropyridine

After heating 10.5 cc. pyridine-2-aldehyde, 30 g. acetoacetic acid-β-hydroxyethyl ester (B.P. 112 to 115° C./0.15 mm. Hg), 11 cc. ammonia and 30 cc. alcohol for 5 hours, the mixture is filtered, concentrated and the residue taken up with acetone. By cooling there are obtained pale yellow crystals of M.P. 128 to 130° C. and the HCl-salt (M.P. 205° C.) is obtained by mixing the acetone solution with ethereal hydrochloric acid.

In an analogous manner the following compounds were produced from the reactants indicated: 4-(3'-pyridyl)-2,6 - dimethyl - 3,5 - di - (carboxylic acid - β - hydroxyethylester)-1,4-dihydropyridine, M.P. 190 to 192° C., from pyridine-3-aldehyde, acetoacetic acid-β-hydroxyethyl ester and ammonia, and 4-(4'-pyridyl)-2,6-dimethyl-3,5 - di - (carboxylic acid - β - hydroxyethylester) - 1,4-dihydropyridine, M.P. 192 to 194° C., from pyridine-4-aldehyde, acetoacetic acid-β-hydroxyethyl ester and ammonia.

EXAMPLE 6

4 - (4' - nitrophenyl) - 2,6 - dimethyl - 3,5 - di - (carboxylic acid-β-hydroxyethyl ester)-1,4-dihydropyridine

A solution of 15 g. acetoacetic acid-β-hydroxyethyl ester, 7.5 g. 4-nitrobenzaldehyde and 5.5 cc. ammonia in 40 cc. alcohol is heated at boiling temperature for 6 to 8 hours, then filtered, somewhat concentrated and mixed with acetone. After cooling, there are obtained yellow crystals of M.P. 110° C.

The corresponding compound obtained with 2-nitrobenzaldehyde, i.e. 4-(2'-nitrophenyl)-2,6-dimethyl-3,5-di-(carboxylic acid-β-hydroxyethyl-ester)-1,4 - dihydropyridine, melts at 137° to 140° C.

EXAMPLE 7

4 - (2' - nitrophenyl) - 2,6 - dimethyl - 3,5 - di - (carboxylic acid-β-methoxyethyl-ester)-1,4-dihydropyridine

After boiling a solution of 7.5 g. 2-nitrobenzaldehyde, 16 g. acetoacetic acid-β-methoxyethyl ester and 5.5 cc. ammonia in 40 cc. alcohol for several hours, filtering off and cooling, there are obtained 14 g. of yellow crystals of M.P. 128 to 130° C.

The corresponding compound obtained with 4-nitrobenzaldehyde, i.e. 4-(4'-nitrophenyl)-2,6-dimethyl-3,5-di-(carboxylic acid-β-methoxyethyl-ester) - 1,4 - dihydropyridine, melts at 108 to 112° C.

EXAMPLE 8

4 - (2' - nitrophenyl) - 2,6 - dimethyl - 3,5 - di - (carboxylic acid-β-ethoxyethyl-ester)-1,4-dihydropyridine

A solution of 7.5 g. 2-nitrobenzaldehyde, 18 g. acetoacetic acid-β-ethoxyethyl ester and 5.5 cc. ammonia in 40 cc. alcohol is heated under reflux for several hours, filtered, concentrated, and the residue is recrystallized from ligroin. 16 g. of golden yellow crystals of M.P. 93 to 96° C. are obtained.

The corresponding compound obtained with 3-nitrobenzaldehyde, i.e. 4-(3'-nitrophenyl)-2,6-dimethyl-3,5-di-(carboxylic acid-β-ethoxyethyl-ester)-1,4-dihydropyridine forms yellow crystals of M.P. 101 to 104° C.

EXAMPLE 9

4 - (3' - nitrophenyl) - 2,6-dimethyl-3,5-di-(carboxylic acid-β-propoxyethyl-ester)-1,4-dihydropyridine

7.5 g. 3-nitrobenzaldehyde, 19 g. acetoacetic acid-β-propoxyethyl ester and 5.5 cc. ammonia are heated in 40 cc. alcohol under reflux for 6 to 8 hours, and after cooling, there are obtained 21 g. of yellow crystals which are recrystallized from ligroin with the addition of some benzene and have M.P. 83 to 86° C.

EXAMPLE 10

4 - (2' - pyridyl) - 2,6 - dimethyl - 3,5 - di - (carboxylic acid-tetrahydrofurfuryl-ester)-1,4-dihydropyridine

10.5 cc. pyridine-2-aldehyde, 40 g. acetoacetic acid-tetrahydrofurfuryl ester (B.P. 114° C./0.2 mm. Hg) and 11 cc. ammonia are heated at boiling temperature for 2 to 3 hours, the product is filtered off and after the addition of some ether, there are obtained 32 g. of white crystals of M.P. 153 to 154° C.

EXAMPLE 11

4 - (2' - pyridyl) - 2,6 - dimethyl - 3,5 - di - (carboxylic acid-furfurylester)-1,4-dihydropyridine

After boiling 20 g. acetoacetic acid furfuryl ester (B.P. 106 to 108° C./0.3 mm. Hg), 5 cc. pyridine-2-aldehyde and 5.5 cc. ammonia in 50 cc. alcohol for several hours, the product is filtered off with suction, and from the residue and filtrate there are obtained 20 g. of white crystals of M.P. 187° C.

Pale yellow crystals of 4-(4'-pyridyl)-2,6-dimethyl-3,5-di-(carboxylic acid-furfuryl-ester)-1,4-dihydropyridine of M.P. 148° C. are obtained in the same manner with pyridine-4-aldehyde.

What is claimed is:

1. A 1,4-dihydropyridine derivative of the formula:

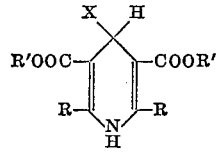

wherein:

R is hydrogen or alkyl of 1 to 3 carbon atoms,

R' is lower-alkoxy, lower-alkyl, hydroxy lower-alkyl, furfuryl or tetrahydrofurfuryl, and X is pyridyl, phenyl, or nitrophenyl, and pharmaceutically acceptable non-toxic salts thereof.

2. A compound according to claim 1 wherein X is pyridyl.

3. A compound according to claim 1 wherein X is phenyl.

4. A compound according to claim 1 wherein X is nitrophenyl.

5. The compound according to claim 1 which is 4-(4'-pyridyl)-2,6-dimethyl-3,5-di-(carboxylic acid-β - methoxyethyl-ester)-1,4-dihydropyridine.

6. The compound according to claim 1 which is 4-(3'-pyridyl)-2,6-dimethyl-3,5-di-(carboxylic acid-β-methoxyethyl-ester)-1,4-dihydropyridine.

7. The compound according to claim 7 which is 4-(2'-pyridyl) - 2,6-dimethyl-3,5-di-(carboxylic acid-β-methoxyethyl-ester)-1,4-dihydropyridine.

8. The compound according to claim 1 which is 4-(3'-pyridyl) - 2,6 - dimethyl-3,5-di-(carboxylic acid-β-ethoxyethyl-ester)-1,4-dihydropyridine.

9. The compound according to claim 1 which is 4-(2'-pyridyl) - 2,6 - dimethyl-3,5-di-(carboxylic acid-β-ethoxyethyl-ester)-1,4-dihydropyridine.

10. The compound according to claim 1 which is 4-(4'-pyridyl) - 2,6 - dimethyl-3,5-di-(carboxylic acid-β-ethoxyethyl-ester)-1,4-dihydropyridine.

11. The compound according to claim 1 which is 4-(3'-pyridyl) - 2,6-dimethyl-3,5-di-(carboxylic acid-β-propoxyethyl-ester)-1,4-dihydropyridine.

12. The compound according to claim 1 which is 4-(2'-pyridyl) - 2,6-dimethyl-3,5-di-(carboxylic acid-β-propoxyethyl-ester)-1,4-dihydropyridine.

13. The compound according to claim 1 which is 4-(4'-pyridyl) - 2,6-dimethyl-3,5-di-(carboxylic acid-β-propoxyethyl-ester)-1,4-dihydropyridine.

14. The compound according to claim 1 which is 4-(2'-pyridyl) - 2,6-dimethyl-3,5-di-(carboxylic acid-γ-methoxybutyl-ester)-1,4-dihydropyridine.

15. The compound according to claim 1 which is 4-(3'-pyridyl) - 2,6-dimethyl-3,5-di-(carboxylic acid-γ-methoxybutyl-ester)-1,4-dihydropyridine.

16. The compound according to claim 1 which is 4-(2'-pyridyl)-2,6-dimethyl-3,5-di - (carboxylic acid-β-methoxybutyl-ester)-1,4-dihydropyridine.

17. The compound according to claim 1 which is 4-(3'-pyridyl) - 2,6-dimethyl-3,5-di-(carboxylic acid-β-hydroxyethyl-ester)1,4-dihydropyridine.

18. The compound according to claim 1 which is 4-(4'-nitrophenyl) - 2,6 - dimethyl-3,5-di-(carboxylic acid-β-hydroxyethyl-ester)-1,4-dihydropyridine.

19. The compound according to claim 1 which is 4-(4' - nitrophenyl)-2,6-dimethyl-3,5-di-(carboxylic acid-β-hydroxyethyl-ester)-1,4-dihydropyridine.

20. The compound according to claim 1 which is 4-(2' - nitrophenyl)-2,6-dimethyl-3,5-di-(carboxylic acid-β-hydroxyethyl-ester)-1,4-dihydropyridine.

21. The compound according to claim 1 which is 4-(2' - nitrophenyl)-2,6-dimethyl-3,5-di-(carboxylic acid-β-methoxy-ethyl-ester)-1,4-dihydropyridine.

22. The compound according to claim 1 which is 4-(4' - nitrophenyl)-2,6-dimethyl-3,5-di-(carboxylic acid-β-methoxyethyl-ester)-1,4-dihydropyridine.

23. The compound according to claim 1 which is 4-(2' - nitrophenyl)-2,6-dimethyl-3,5-di-(carboxylic acid-β-ethoxyethyl-ester)-1,4-dihydropyridine.

24. The compound according to claim 1 which is 4-(3' - nitrophenyl)-2,6-dimethyl-3,5-di-(carboxylic acid-β-ethoxyethyl-ester)-1,4-dihydropyridine.

25. The compound according to claim 1 which is 4-(3' - nitrophenyl)-2,6-dimethyl-3,5-di-(carboxylic acid-β-propoxyethyl-ester)-1,4-dihydropyridine.

26. The compound according to claim 1 which is 4-(2' - pyridyl) - 2,6-dimethyl-3,5-di-(carboxylic acid-tetrahydrofurfuryl-ester)-1,4-dihydropyridine.

27. The compound according to claim 1 which is 4-(2'-pyridyl)-2,6-dimethyl-3,5-di-(carboxylic acid-furfuryl-ester)-1,4-dihydropyridine.

28. The compound according to claim 1 which is 4-(4'-pyridyl)-2,6-dimethyl-3,5-di-(carboxylic acid-furfuryl-ester)-1,4-dihydropyridine.

References Cited

Triebs et al., Chemical Abstracts, vol. 57, par. 2031–2033 (1962).

HENRY R. JILES, Primary Examiner

A. L. ROTMAN, Assistant Examiner

U.S. Cl. X.R.
424—266